(12) United States Patent
Kim et al.

(10) Patent No.: US 6,449,235 B1
(45) Date of Patent: Sep. 10, 2002

(54) OPTICAL PICK-UP APPARATUS AND OPTICAL RECORDING/REPRODUCING APPARATUS USING THE SAME

(75) Inventors: Jin Yong Kim, Kyungki-do; Seong Yun Jeong, Seoul, both of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/285,436

(22) Filed: Apr. 2, 1999

(30) Foreign Application Priority Data

| Apr. 4, 1998 | (KR) | 98-11972 |
| Apr. 4, 1998 | (KR) | 98-11973 |
| Apr. 4, 1998 | (KR) | 98-11974 |

(51) Int. Cl.$^7$ .............................. G11B 7/00
(52) U.S. Cl. ................ 369/112.01; 369/118; 369/94
(58) Field of Search ............. 369/112.01, 112.06, 369/112.07, 112.02, 112.2, 44.23, 94, 118

(56) References Cited

U.S. PATENT DOCUMENTS

| 5,526,338 | A | * | 6/1996 | Hasman et al. | 369/112 |
| 5,923,635 | A | * | 7/1999 | Yamanaka | 369/44.23 |
| 5,930,219 | A | * | 7/1999 | Kim | 369/109 |
| 6,009,066 | A | * | 12/1999 | Yoo et al. | 369/112 |
| 6,067,283 | A | * | 5/2000 | Muramatsu | 369/112 |
| 6,084,842 | A | * | 7/2000 | Miura | 369/112 |
| 6,115,345 | A | * | 9/2000 | Kato et al. | 369/112 |
| 6,124,988 | A | * | 9/2000 | Yanagisawa et al. | 369/44.23 |
| 6,134,055 | A | * | 10/2000 | Koike | 369/44.23 |
| 6,167,019 | A | * | 12/2000 | Tsuchiya et al. | 369/112 |
| 6,201,780 | B1 | * | 3/2001 | Katayama | 369/112 |
| 6,222,812 | B1 | * | 4/2001 | Yoo et al. | 369/112.2 |
| 6,259,668 | B1 | * | 7/2001 | Lee et al. | 369/44.23 |

FOREIGN PATENT DOCUMENTS

| JP | 08321065 | 12/1996 |
| JP | 09 63103 | 3/1997 |
| JP | 09161307 | 6/1997 |
| JP | 9185839 | 7/1997 |
| JP | 9198704 | 7/1997 |
| JP | 09274730 | 10/1997 |
| JP | 11296890 | 10/1999 |
| KR | 1992-701962 | 8/1992 |

* cited by examiner

Primary Examiner—Nabil Hindi
(74) Attorney, Agent, or Firm—Birch, Stewart, Kolasch & Birch, LLP (57) ABSTRACT

An optical pickup apparatus that can adaptive for a plurality types of optical discs different in the layout condition such as a recording density, etc. and an optical recording/reproducing apparatus employing the optical pickup apparatus. In the optical pickup apparatus, first and second light sources generate a different wavelength of light beams. An optical system allows a light beam generated from any one of the first and second light sources to be selectively irradiated onto the optical disc and have an aperture number controller allowing the number of aperture of a light beam to have a different value. A photo detector detects the light beam reflected from the optical disc to be accessed to convert the same into an electrical signal. The apparatus is capable of accessing three types of optical discs different in the layout condition by utilizing an appropriate combination of a wavelength of the light beam with the number of aperture.

19 Claims, 8 Drawing Sheets

OPTICAL PICK-UP APPARATUS AND OPTICAL RECORDING/REPRODUCING APPARATUS USING THE SAME

BACKGROUND OF THE INVENTION

1. Field of the Invention

This invention relates to an optical recording/reproducing apparatus, and more particularly to an optical pickup apparatus, that is adaptable for various types of optical recording media having different layout conditions such as recording density. Also, the present invention is directed to an optical recording/reproducing apparatus using the optical pickup apparatus.

2. Description of the Prior Art

Generally, an optical recording/reproducing apparatus for driving disc-type media, such as a compact disc(CD) (which are well known as recording media making use of a laser light beam), records or reproduces data by irradiating a laser beam onto the recording face of a disc while rotating the disc. To this end, the optical recording/reproducing apparatus includes an optical pickup for irradiating a laser beam generated from a light source, such as a semiconductor laser, onto the recording face of the optical disc using optical system devices such as an objective lens.

Recently, a digital versatile disc(DVD) is now commercially available that is capable of storing a larger amount of information than the conventional CD. The DVD is usually designed for use with a light source having a different number of aperture and a different wavelength from the CD. In this case, the wavelength and the number of aperture of a light beam is related to the size of beam spot. The size of beam spot is selected from the standpoint of minimizing an effect caused by cross-talk between signal tracks on the recording face of the optical disc. Accordingly, since the DVD (with a larger recording density than the CD) has a small track pitch, the size of beam spot must also be smaller than that of the CD. In this case, a scheme making use of a shortened wavelength and an increased aperture number can be considered for reducing the size of beam spot. This approach may be viable since the size of a beam spot is directly proportional to the wavelength of the light beam while being inversely proportional to the number of aperture as seen from the following formula:

$$d = k \frac{\lambda}{NA} \quad (1)$$

wherein d represents the size of beam spot, k is a constant, $\lambda$ is a wavelength of a light beam, and NA is the number of aperture of an objective lens. It can be seen from the formula (1) that a short wavelength and a large aperture number is used as to obtain a smaller size of beam spot when using a DVD as compared to the CD. For instance, an optical pickup for accessing the CD uses a light beam with a wavelength($\lambda$) of 780 nm and an objective lens with the number of aperture of 0.45, whereas an optical pickup for accessing the DVD uses a light beam with a wavelength ($\lambda$) of 650 nm and an objective lens with the number of aperture of 0.6. Also, in the DVD, a light beam is sensitive to the thickness of the disc as the number of aperture of a light beam changes. The depth of the recording face, that is, the depth of the light transmission layer, is set to have a smaller value in a DVD than that of the CD. In other words, a noise component increases so that data cannot be recorded or reproduced due to an increase in the optical aberration when a light is transmitted by means of an objective lens with an aperture number of 0.6 through a light transmission layer with a thickness equal to that of a CD. Thus, the thickness of the light transmission layer in the DVD is set to have a smaller value than that in the CD. For instance, a light transmission layer of the CD has a thickness of 1.2 mm while a light transmission layer of the DVD has half the thickness thereof, that is, a thickness of 0.6 mm.

An optical pickup for changeably accessing both a CD and DVD must include two light sources generating a different wavelengths of light beams and two objective lenses with a different number of aperture. Where an optical pickup is provided with two light sources and two objective lenses, problems occur in that the optical pickup size becomes large, its structure is complicated, and manufacturing costs increases. In order to solve these problems, an optical pickup has been used where it has a single light source and means for appropriately controlling the number of aperture of the objective lens depending on the corresponding disc to thereby access the CD and the DVD.

For example, Japanese Patent Laid-open Gazette No. Pyung 9-185839 has disclosed an optical pickup that can access two types of optical discs of different thicknesses with light transmission layers by controlling the number of aperture of an objective lens employing a liquid crystal filter and a polarizing filter. The optical pickup controls the number of aperture of the objective lens into two modes by turning the liquid crystal filter on or off depending on whether or not a voltage is applied, to thereby selectively change the polarization characteristic of a light beam generated from a light source, and by allowing the polarizing filter to selectively shut out a portion of the light beam in accordance with the polarization characteristic of a light beam changed by means of the liquid filter.

Also, Japanese Patent Laid-open Gazette No. Pyung 9-198704 has disclosed an optical pickup that is capable of accessing two types of optical discs by providing two objective lenses with a single lens supporting member in the twin-lens system to thereby switch a position of the objective lens in accordance with a rotation of the lens supporting member.

A different approach involves blue lasers. Blue lasers generate a significantly lower wavelength of light beam as compared with conventional red laser beams. The blue laser is a light source that is expected to be commercially available in accordance with development of GaN system laser. It is reported that a wavelength band of the blue laser is approximately 400 nm. A next-generation optical disc employing such a blue laser, hereinafter referred to as "HD-DVD", requires a light source with a different wavelength along with an objective lens with a corresponding number of aperture. Particularly, the HD-DVD requires a larger number of aperture because short wavelength of a blue light beam allows it to have. a higher density such that its beam spot size must be smaller than the spot used with the DVD. More specifically, a wavelength ($\lambda$) of a light beam and the number of aperture NA applied to each of the HD-DVD, the DVD and the CD have a relationship in the following formula:

$$\lambda 1 < \lambda 2 < \lambda 3 \quad (2)$$
$$NA1 \geq NA2 \geq NA3$$

wherein $\lambda 1$, $\lambda 2$ and $\lambda 3$ are wavelengths of light beams corresponding sequentially to the blue laser disc, the DVD and the CD, and NA1, NA2 and NA3 are the number of aperture corresponding sequentially to the blue laser disc, the DVD and the CD. Accordingly, the size of beam spots irradiated onto the three types of optical discs has a relationship in the following formula (3) when the above formulas (1) and (2) are applied.

$$d1 < d2 < d3 \quad (3)$$
$$\frac{\lambda 1}{NA1} < \frac{\lambda}{NA2} < \frac{\lambda 3}{NA3}$$

wherein d1, d2 and d3 represent the size of beam spots irradiated onto the HD-DVD, the DVD and the CD, respectively. As described above, the HD-DVD, the DVD and the CD have a different beam spot size due to a difference in the layout condition such as a recording density, etc. Accordingly, when it is intended to interchangeably access the three types of optical discs with a single optical recording/reproducing apparatus, three light sources and three objective lenses are required in the conventional method. However, when the optical pickup includes three light sources and three objective lenses, it has problems in that its structure becomes complicated and that the manufacturing costs increase. Accordingly, it is necessary to provide an optical pickup apparatus that is capable of accessing at least three types of optical discs with a different layout condition as well as having a minimum of constituent elements.

SUMMARY OF THE INVENTION

Accordingly, it is an object of the present invention to provide an optical pickup apparatus that is capable of changeably accessing at least three types of optical discs in a different layout condition.

A further object of the present invention is to provide an optical recording/reproducing apparatus employing the above-mentioned optical pickup apparatus.

In order to achieve these and other objects of the invention, an optical pickup apparatus according to one aspect of the present invention includes first and second light sources for generating a different wavelength of light beams; an optical system allowing a light beam generated by any one of the first and second light sources to be selectively irradiated onto the discs and having aperture number control means for allowing the number of aperture of the light beam to have a different value depending on an optical disc to be accessed; and photo detecting means for detecting a light beam reflected from the accessed optical disc and converting it into an electrical signal.

An optical recording/reproducing apparatus according to another aspect of the present invention includes the above-mentioned optical pickup apparatus.

An optical pickup apparatus according to still another aspect of the present invention includes a light source for generating a certain wavelength of light beam; an optical system allowing the light beam to be irradiated onto an optical disc to be accessed, said system having aperture number control means for allowing the number of aperture of the light beam to have a different value depending on the optical disc to be accessed; and photo detecting means for detecting a light beam reflected from the accessed optical disc and converting the detected light beam into an electrical signal.

An optical pickup apparatus according to still another aspect of the present invention includes a first light source for generating a first light beam; a second light source for generating a second light beam having a larger wavelength than the first light beam; an optical system allowing any one of the first and second light beams to be selectively irradiated onto an optical disc to be accessed, said system having aperture number control means for allowing the number of aperture of the light beam to have any one of a first value and a second value smaller than the first value, depending on the optical disc to be accessed; and photo detecting means for detecting a light beam reflected from the accessed optical disc and converting the detected light beam into an electrical signal, whereby said apparatus allows the first light beam to be irradiated with the first value of the aperture number when the optical disc to be accessed is the first optical disc, allows the second light beam to be irradiated with the second value of the aperture number when the optical disc to be accessed is the second optical disc, and allows the second light beam to be irradiated with the second value of the aperture number when the optical disc to be accessed is the third optical disc.

An optical pickup apparatus according to still another aspect of the present invention includes a first light source for generating a first light beam; a second light source for generating a second light beam having a larger wavelength than the first light beam; an optical system allowing any one of the first and second light beams to be selectively irradiated onto an optical disc to be accessed, said system having aperture number control means for allowing the number of aperture of the light beam to have any one of a first value and a second value smaller than the first value, depending on the optical disc to be accessed; and photo detecting means for detecting a light beam reflected from the accessed optical disc and converting the detected light beam into an electrical signal, whereby said apparatus allows the first light beam to be irradiated with the first value of the aperture number when the optical disc to be accessed is the first optical disc, allows the first light beam to be irradiated with the second value of the aperture number when the optical disc to be accessed is the second optical disc, and allows the second light beam to be irradiated with the second value of the aperture number when the optical disc to be accessed is the third optical disc.

An optical pickup apparatus according to still another aspect of the present invention includes a first light source for generating a first light beam; a second light source for generating a second light beam having a larger wavelength than the first light beam; an optical system allowing any one of the first and second light beams to be selectively irradiated onto an optical disc to be accessed, said system having aperture number control means for allowing the number of aperture of the light beam to have any one of a first value, a second value smaller than the first value and a third value smaller than the second value, depending on the optical disc to be accessed; and photo detecting means for detecting a light beam reflected from the accessed optical disc and converting the detected light beam into an electrical signal, whereby said apparatus allows the first light beam to be irradiated with the first value of the aperture number when the optical disc to be accessed is the first optical disc, allows the first light beam to be irradiated with the second value of the aperture number when the optical disc to be accessed is the second optical disc, and allows the second light beam to be irradiated with the third value of the aperture number when the optical disc to be accessed is the third optical disc.

An optical pickup apparatus according to still another aspect of the present invention includes a first light source for generating a first light beam; a second light source for generating a second light beam having a larger wavelength than the first light beam; an optical system allowing any one of the first and second light beams to be selectively irradiated onto an optical disc to be accessed, said system having aperture number control means for allowing the number of aperture of the light beam to have any one of a first value, a second value smaller than the first value and a third value smaller than the second value, depending on the optical disc to be accessed; and photo detecting means for detecting a light beam reflected from the accessed optical disc and converting the detected light beam into an electrical signal, whereby said apparatus allows the first light beam to be irradiated with the first value of the aperture number when the optical disc to be accessed is the first optical disc, allows the second light beam to be irradiated with the second value of the aperture number when the optical disc to be accessed is the second optical disc, and allows the second light beam to be irradiated with the third value of the aperture number when the optical disc to be accessed is the third optical disc.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

An optical pickup apparatus is intended for use in accessing three different types of optical discs requiring different sizes of beam spots by a proper combination of the wavelength ($\lambda$) of a light beam and the number of aperture NA using the fewest number of different elements.

First, an optical pickup apparatus according to the present invention can obtain the sizes of beam spots corresponding to the blue laser, the DVD and the CD by utilizing an appropriate combination of two light sources generating a different wavelength ($\lambda$) of light beam with an optical system for controlling the number of aperture NA into two modes.

More specifically, the optical pickup apparatus according to the present invention can obtain first to third beam spot sizes d1, d2 and d3 corresponding to the blue laser, the DVD and CD by sequentially using the first wavelength ($\lambda$1) of about 400 nm and the third wavelength ($\lambda$3) of about 780 nm, and the first number of aperture NA1 of about 0.7 and the third number of aperture NA3 of about 0.45. In this case, the relationship of the first to third beam spots size d1, d2 and d3 with respect to the wavelength $\lambda$ and the number of aperture NA can be expressed by the following formula:

$$d1 = k\frac{\lambda 1}{NA1}$$
$$d2 = k\frac{\lambda 3}{NA1}$$
$$d3 = k\frac{\lambda 3}{NA3}$$
(4)

It can be seen from the formula (4) that the optical pickup apparatus makes use of the first wavelength $\lambda$1 and the first number of aperture NA1 in accessing the HD-DVD, of the third wavelength $\lambda$3 and the first number of aperture NA1 in accessing the DVD, and of the third wavelength $\lambda$3 and the third number of aperture NA3 in accessing the CD. To this end, an optical pickup apparatus according to the first embodiment of the present invention has a configuration as shown in FIG. 1.

Figure 1:
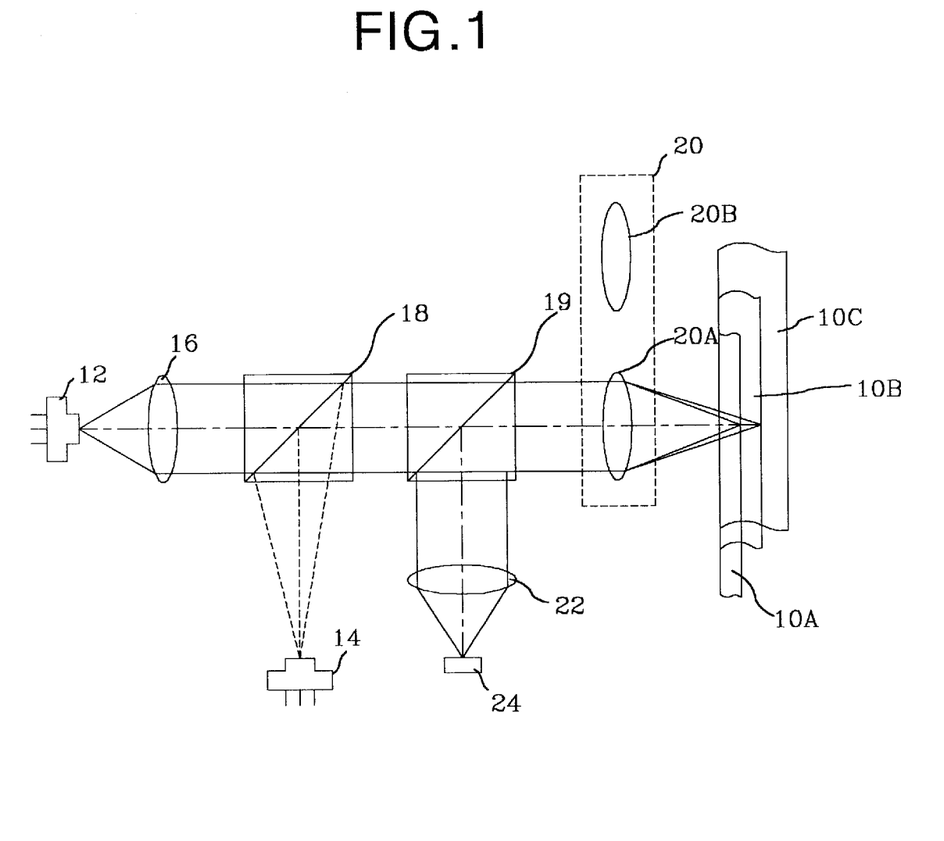
FIG. 1 is a schematic view showing the configuration of an optical system in an optical pickup apparatus according to the first embodiment of the present invention.

Referring to FIG. 1, the optical pickup apparatus includes first and second light sources 12 and 14 for generating a first wavelength ($\lambda$1) of light beam and a third wavelength ($\lambda$3) of light beam, respectively, a twin objective lens 20 with the first number of aperture NA1 and the third number of aperture NA3 for converging an incident light beam onto the recording faces of first to third optical discs 10A, 10B and 10C by its position control, and a photo detector 24 for converting light beams reflected from the first to third optical discs 10A, 10B and 10C into electrical signals. Further, the optical pickup apparatus includes a first beam splitter 18 positioned in the path of light beams emitted from the first and second light sources 12 and 14, a second beam splitter 19 arranged among the first beam splitter 18, the twin objective lens 20 and the photo detector 24, a collimator lens 16 arranged between the first light source 12 and the first beam splitter 18, and a sensor lens 22 arranged between the photo detector 24 and the second beam splitter 19.

In the optical pickup apparatus of FIG. 1, the first to third optical discs 10A, 10B and 10C represent the HD-DVD, the DVD and the CD, respectively. The first light source 12 generates a first wavelength ($\lambda$1) of light beam using the blue laser while the second light source 14 generates a third wavelength ($\lambda$3) of light beam. The collimator lens 16 converts a divergent light beam progressing from the first light source 12 toward the first beam splitter 18 into a parallel light beam to thereby prevent any leakage of light. The light beam from the collimator lens 16 passes through the first beam splitter 18 toward the second beam splitter 19. A light beam from the second light source 14 progresses toward the second beam splitter 19 and is reflected toward the second beam splitter 19. The second beam splitter 19 passes a light beam from the first beam splitter 18 toward the twin objective lens 20. Also, the second beam splitter 19 reflects a light beam reflected from the recording faces of the first to third optical discs 10A, 10B and 10C and progressed over the twin objective lens 20, via the sensor lens 22, into the photo detector 24. In this case, a Dichroic polarizer beam splitter is usually used as the first and second beam splitters 18 and 19.

The sensor lens 22 converges a parallel light beam progressing from the second beam splitter 19 toward the photo detector 24 onto the surface of the photo detector 24 to thereby prevent any leakage of the light beam. The photo detector 24 detects a reflective light beam reflected by the recording faces of the first to third optical discs 10A, 10B and 10C and then received by way of the twin objective lens 20, the second beam splitter 19 and the sensor lens 22, and converts it into an electrical signal.

The twin objective lens 20 includes first and second objective lens 20A and 20B having the first number of aperture NA1 of about 0.7 and the third number of aperture NA3 of about 0.45. The first and second objective lens 20A and 20B are installed in a single lens supporting member 20C which is rotated to position the first and second objective lens 20A and 20B. The lens supporting member is driven with an actuator (not shown), which is usually driven by an axis sliding system that allows the lens supporting member 20C to pivot around a rotation axis. Access to the first to third optical discs 10A, 10B and 10C in such an optical pickup apparatus will be described in detail.

When the first optical disc 10A is accessed in the optical pickup apparatus of FIG. 1, the first optical source 12 is driven and the first objective lens 20A with the first number of aperture NA1 is positioned at a light path by a driving of the twin objective lens 20. A first wavelength ($\lambda 1$) of light beam generated at the first light source 12 passes through the first and second beam splitters 18, 19 to be incident to the first objective lens 20A. This incident light beam is converged by the first objective lens 20A to be irradiated onto the recording face of the first optical disc 10A with the first beam spot size d1.

When the second optical disc 10B is accessed, the second optical source 14 is driven and the first objective lens 20A with the first number of aperture NA1 is positioned at a light path by a driving of the twin objective lens 20. A third wavelength ($\lambda 3$) of light beam generated at the second light source 14 is perpendicularly reflected by the first beam splitter 18 and passes through the second beam splitter 19 to be incident to the first objective lens 20A. This incident light beam is converged by the first objective lens 20A to be irradiated onto the recording face of the second optical disc 10B with the second beam spot size d2.

When the first optical disc 10C is accessed in the optical pickup apparatus of FIG. 1, the first optical source 12 is driven and the first objective lens 20A with the first number of aperture NA1 is positioned at a light path by a driving of the twin objective lens 20. A first wavelength ($\lambda 1$) of light beam generated at the first light source 12 passes through the first and second beam splitters 18, 19 to be incident to the first objective lens 20A. This incident light beam is converged by the first objective lens 20A to be irradiated onto the recording face of the first optical disc 10A with the first beam spot size d1.

TABLE 1

|  | WAVELENGTH ($\lambda$) | NUMBER OF APERTURE (NA) |
|---|---|---|
| 1st OPTICAL DISC (BLUE) | 400 nm | 0.7 |
| 2nd OPTICAL DISC (DVD) | 780 nm | 0.7 |
| 3rd OPTICAL DISC (CD) | 780 nm | 0.45 |

Figure 2:
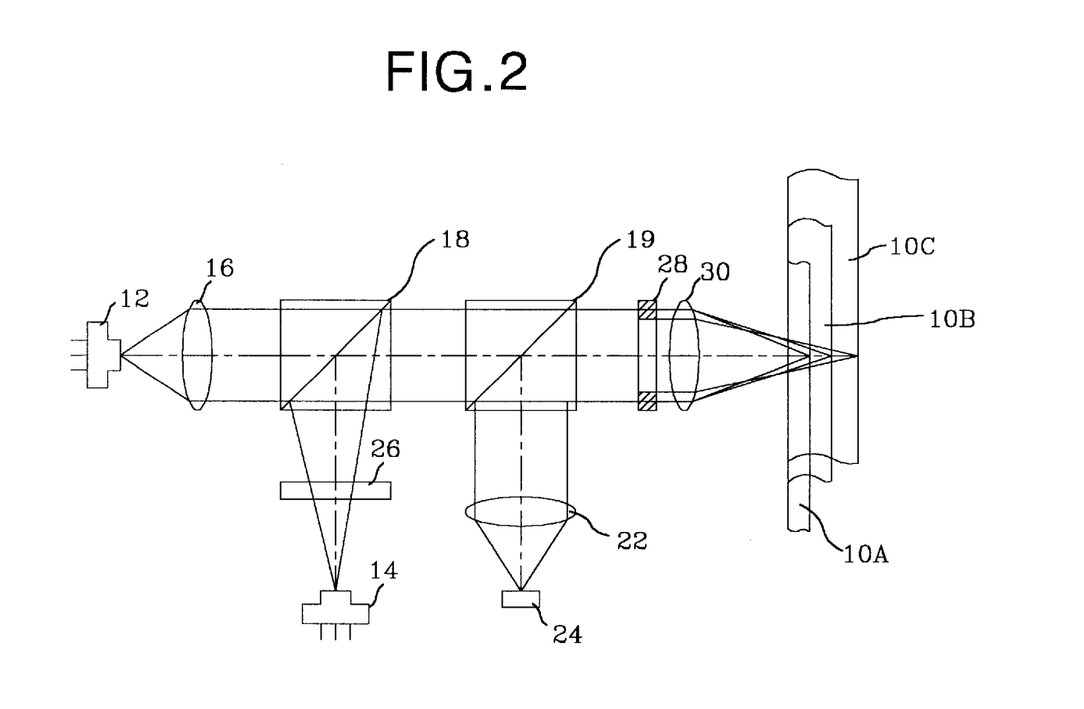
FIG. 2 is a schematic view showing the configuration of an optical system in an optical pickup apparatus according to the second embodiment of the present invention.

FIG. 2 shows the configuration of an optical system in an optical pickup apparatus according to the second embodiment of the present invention. Referring to FIG. 2, the optical pickup apparatus includes a single objective lens 30 instead of the twin objective lens 20 shown in FIG. 1, and an aperture number controller for controlling the number of aperture of the objective lens 30, that is, a liquid crystal plate 26 and a polarizing plate 28.

In the optical pickup apparatus of FIG. 2, each of the first and second light sources 12 and 14 generates a vertical polarized beam having a polarization characteristic moving at the short axis direction with respect to an ellipse, hereinafter referred to as "S wave", or a horizontal polarized beam having a polarization characteristic moving at the long axis direction with respect to an ellipse, hereinafter referred to as "P wave". For the sake of convenience, it is assumed in the present invention that the light beams generated at the first and second light sources 12 and 14 are S waves.

The liquid crystal plate 26 is arranged between the second light source 14 and the first beam splitter 18, and the polarizing plate 28 is arranged between the second beam splitter 19 and the objective lens 30. The liquid crystal plate 26 varies the polarization characteristic of a light beam depending on whether or not a voltage has been applied, and the polarizing plate 28 selectively shuts out a portion of the light beam in accordance with a polarizing characteristic of an incident light beam. More specifically, the liquid crystal plate 26 passes an S wave when a voltage is applied, whereas it rotates an S wave at 90° (to be converted into P wave and outputs the converted P wave) when a voltage is not applied. Otherwise, if P wave is generated at the second light source 14, then the liquid crystal plate 28 converts the P wave into S wave when a voltage is applied while it passes the P wave as it is when a voltage is not applied.

Figure 3:
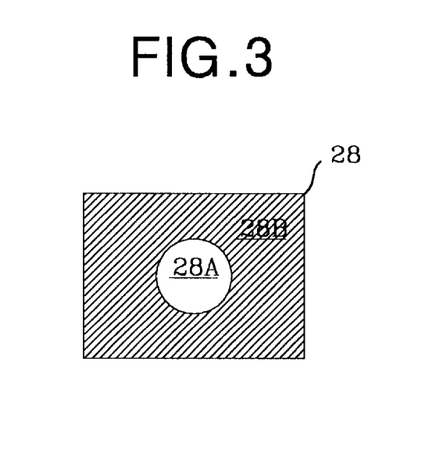
FIG. 3 is a plan view of the polarizing plate shown in FIG. 2.

As shown in FIG. 3, the polarizing plate 28 includes a circular non-polarizing area 28A and a polarizing area 28B defined around the non-polarizing area 28A. In this case, the non-polarizing area 28A of the polarizing plate 28 allows the light beam to be passed toward the objective lens 30 independently of the polarization characteristic of an incident light beam. The polarizing area 28B passes the light beam when a polarizing direction of an incident light beam is identical to its polarizing direction, whereas it shuts out the light beam when a polarizing direction of an incident light beam is different from its polarizing direction. Usually, such a polarizing plate 28 is integral to the objective lens 30.

In FIG. 2, the polarizing plate 28 is positioned so that the non-polarizing area 28A corresponds to the third number of aperture NA3, and is formed in such a manner that the polarizing area 28B shuts out P waves. Accordingly, when a P wave is received, the flux diameter of an incident light beam is controlled by the polarizing area 28B to control the number of aperture. An access to the first to third optical discs 10A, 10B and 10C in such an optical pickup apparatus will be described in detail.

When the first optical disc 10A is accessed in the optical pickup apparatus of FIG. 2, the first light source 12 is driven. A first wavelength ($\lambda 1$) of S wave generated at the first light source 12 is incident to the objective lens 30 by way of the collimator lens 16, the first and second beam splitters 18, 19 and the polarizing plate 28. This incident light beam is converged by the first objective lens 30 with the first number of aperture to be irradiated onto the recording face of the first optical disc 10A with the first beam spot size d1.

When the second optical disc 10B is accessed, the second light source 14 is driven and a voltage is applied to the liquid crystal plate 26. A third wavelength ($\lambda 3$) of S wave is generated at the second light source 14, transmits through the liquid crystal plate 26 applied with a voltage as it is, and is perpendicularly reflected by the first beam splitter 18 to thereby be incident on the objective lens 30 by way of the second beam splitter 19 and the polarizing plate 28. This incident light beam is converged by the objective lens 30 and irradiated onto the recording face of the second optical disc 10B with a second beam spot size d2.

When the third optical disc 10C is accessed, the second light source 14 is driven and a voltage is not applied to the liquid crystal plate 26. A third wavelength (λ3) of S wave generated at the second light source 14, converted into a P wave by the liquid crystal plate 26 which is not applied with a voltage, and is perpendicularly reflected by the beam splitter 18 to thereby be incident on the polarizing plate 28 by way of the second beam splitter 19. The P wave received into the polarizing plate 28 is shut out by the outer polarizing area 28B and passed by the non-polarizing area 28A, so that the number of aperture of a light beam is controlled into the third number of aperture NA3 to be incident to the objective lens 30. This incident light beam is converged by the objective lens 30 and irradiated onto the recording face of the third optical disc 10C.

The optical pickup apparatus according to the present invention can obtain first to third beam spots size d1, d2 and d3 corresponding to the blue laser (HD-DVD), the DVD and the CD, respectively, by utilizing a light beam with a first wavelength (λ1) of about 400 nm and a third wavelength (λ3) of about 780 nm, the fourth number of aperture NA4 of about 0.37 less than the third number of aperture NA3 and the first number of aperture NA1 of about 0.7, as different from the optical pickup apparatus shown in FIG. 1 and FIG. 2. In this case, a relationship among the first to third beam spot sizes d1, d2 and d3, the wavelength (λ) and the number of aperture NA can be expressed as the following formula:

$$d1 = k\frac{\lambda 1}{NA1}$$
$$d2 = k\frac{\lambda 1}{NA4}$$
$$d3 = k\frac{\lambda 2}{NA4}$$
(5)

It can be seen from the formula (5) that, the optical pickup apparatus uses the first wavelength (λ1) and the first number of aperture NA1 when it accesses the HD-DVD, it uses the first wavelength (λ1) and the fourth number of aperture NA4 when it accesses the DVD, and it uses the second wavelength (λ2) and the fourth number of aperture NA4 when it accesses the CD. To this end, the optical pickup apparatus according to the third embodiment of the present invention has a construction as shown in FIG. 4.

Figure 4:
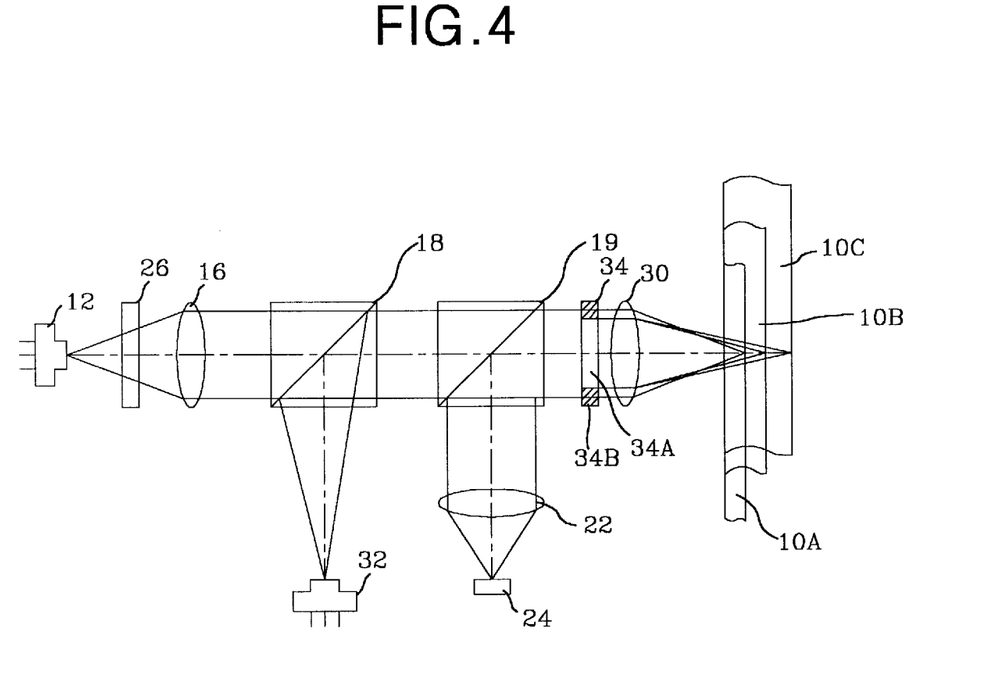
FIG. 4 is a schematic view showing the configuration of an optical system in an optical pickup apparatus according to the third embodiment of the present invention.

The optical pickup apparatus shown in FIG. 4 includes the same construction elements as the optical pickup apparatus shown in FIG. 2 except for a second light source 32 generating a second wavelength (λ2) of light beam, a liquid crystal plate 26 arranged at the side of first light source 12 and a polarizing plate 26 having a non-polarizing area 34A with a dimension corresponding to the fourth number of aperture NA4. A detailed explanation of the construction elements that are identical to the optical pickup apparatus in FIG. 2 will be omitted.

When the first optical disc 10A is accessed in the optical pickup apparatus of FIG. 4, the first optical source 12 is driven and a voltage is applied to the liquid crystal plate 26. A first wavelength (λ1) of S wave generated at the first light source 12 is incident on the objective lens 30 by way of the collimator lens 16, the first and second beam splitters 18, 19 and the polarizing plate 34. This incident light beam is converged by the first objective lens 30 with the first number of aperture NA1 to be irradiated onto the recording face of the first optical disc 10A at the first beam spot size d1.

When the second optical disc 10B is accessed, the first optical source 12 is driven and a voltage is not applied to the liquid crystal plate 26. A first wavelength (λ1) of S wave generated at the first light source 12 is converted into P wave, and is incident on the polarizing plate 34 by way of the first and second beam splitters 18 and 19. The P wave received into the polarizing plate 34 is shut out at the outer polarizing area 34B and passes through the non-polarizing area 34A, so that the number of aperture NA of a light beam is controlled into the fourth number of aperture NA to be incident on the objective lens 30. This incident light beam is converged by the objective lens 30 and irradiated onto the recording face of the second optical disc 10B with a second beam spot size d2.

When the third optical disc 10C is accessed, the second light source 14 is driven. In this case, the second light source 32 generates a P wave differently from the first light source generating an S wave. A second wavelength (λ2) of P wave generated at the second light source 14 is perpendicularly reflected by the beam splitter 18 to thereby be incident on the polarizing plate 34 by way of the second beam splitter 19. The P wave received into the polarizing plate 34 is shut out at the outer polarizing area 34B and passes through the non-polarizing area 28A, so that the number of aperture of a light beam is controlled into the third number of aperture NA3 to be incident to the objective lens 30. This incident light beam is converged by the objective lens 30 and irradiated onto the recording face of the third optical disc 10C with the third beam spot size d3.

A numerical value example of a wavelength of light beam and the number of aperture corresponding to the first to third optical discs 10A, 10B and 10C is described in the following table.

TABLE 2

|  | WAVELENGTH (λ) | NUMBER OF APERTURE (NA) |
| --- | --- | --- |
| 1st OPTICAL DISC (BLUE) | 400 nm | 0.7 |
| 2nd OPTICAL DISC (DVD) | 400 nm | 0.37 |
| 3rd OPTICAL DISC (CD) | 650 nm | 0.37 |

As described above, the optical pickup apparatus according to the present invention can access three types of optical discs that are different in recording density, light transmission layer, and other aspects by creating light beam sizes using two optical sources that generate different wavelengths of light beams and an optical system controlled into two aperture number modes. Also, the optical pickup apparatus according to the present invention can obtain beam spots having sizes that correspond to a HD DVD (blue laser), a DVD and a CD by utilizing an appropriate combination of two light sources generating a different wavelength of light beams with an optical system for controlling the number of aperture of a light beam into three modes.

More specifically, an optical pickup apparatus according to the present invention can obtain first to third beam spot sizes d1, d2 and d3 corresponding to the blue laser, the DVD and CD, respectively, using light beams with a first wavelength (λ1) of about 400 nm and a third wavelength (λ3) of about 780 nm, and the first number of aperture NA1 of about 0.7, the third number of aperture NA3 of about 0.45 and the fourth number of aperture NA4 of about 0.37. In this case, a relationship of the first to third beam spots size d1, d2 and d3 with respect to the wavelength λ and the number of aperture NA can be expressed by the following formula:

$$d1 = k\frac{\lambda 1}{NA1}$$
$$d2 = k\frac{\lambda 1}{NA4}$$
$$d3 = k\frac{\lambda 3}{NA3}$$
(6)

It can be seen from the formula (6) that the optical pickup apparatus makes use of the first wavelength λ1 and the first number of aperture NA1 when accessing the HD-DVD, of the first wavelength λ1 and the fourth number of aperture NA4 when accessing the DVD, and of the third wavelength λ3 and the third number of aperture NA3 when accessing the CD. To this end, an optical pickup apparatus according to the fourth embodiment of the present invention has a configuration as shown in FIG. 5.

Figure 5:
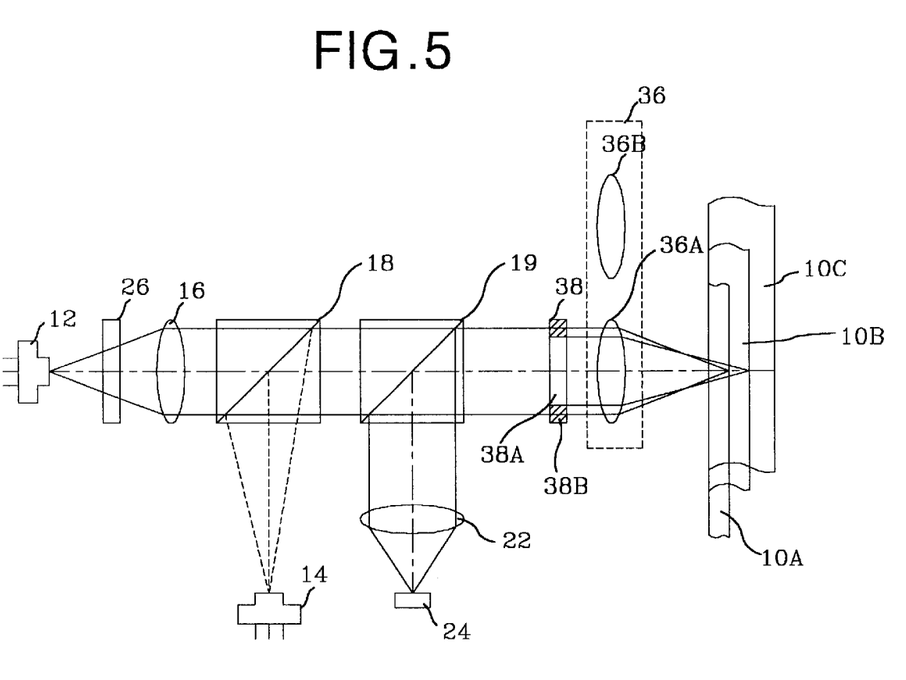
FIG. 5 is a schematic view showing the configuration of an optical system in an optical pickup apparatus according to the fourth embodiment of the present invention.

The optical pickup apparatus in FIG. 5 includes many of the same elements as the optical pickup apparatus in FIG. 4 except for a second light source 14 for generating a third wavelength (λ3) of light beam, a polarizing plate 38A having a non-polarizing area 38A with a size corresponding to the fourth number of aperture NA4, and a twin objective lens 36.

In the optical pickup apparatus of FIG. 5, the twin objective lens 36 includes first and second objective lens 36A and 36B having the first number of aperture NA1 and the second number of aperture NA2, respectively.

When the first optical disc 10A is accessed in the optical pickup apparatus of FIG. 5, the first optical source 12 is driven and a voltage is applied to the liquid crystal plate 26, and, simultaneously, the first objective lens 36A with the first number of aperture NA1 is positioned at a light path by driving of the twin objective lens 36. A first wavelength (λ1) of S wave generated at the first light source 12 is incident on the first objective lens 36A by way of the liquid crystal plate 26, the collimator lens 16, the first and second beam splitters 18, 19 and the polarizing plate 38. This incident light beam is converged by the first objective lens 36A with the first number of aperture NA1 to be irradiated onto the recording face of the first optical disc 10A at the first beam spot size d1.

When the second optical disc 10B is accessed, the first optical source 12 is driven and a voltage is not applied to the liquid crystal plate 26, and, simultaneously, the first objective lens 36A with the first number of aperture NA1 is positioned at a light path by driving of the twin objective lens 36. A first wavelength (λ1) of S wave generated at the first light source 12 is converted into P wave by the liquid crystal plate 26 in which a voltage is not applied, and is incident on the polarizing plate 38 by way of the first and second beam splitters 18 and 19. The P wave received into the polarizing plate 38 is shut out at the outer polarizing area 38B and passes through only the non-polarizing area 38A, so that the number of aperture NA of a light beam is controlled into the fourth number of aperture NA to be incident on the objective lens 30. This incident light beam is converged by the first objective lens 36A and irradiated onto the recording face of the second optical disc 10B with a second beam spot size d2.

When the third optical disc 10C is accessed, the second light source 14 is driven and the second objective lens 36B is positioned at a light path by driving of a twin objective lens 36. A third wavelength (λ3) of S wave generated from the second light source 14 is perpendicularly reflected by the first beam splitter 18 and is incident on the second objective lens 36B by way of the second beam splitter 19 and the polarizing plate 38. The incident light beam is converged by the second objective lens 36B and irradiated onto the recording face of the third optical disc 10C with the third beam spot size d3.

A numerical value example of a wavelength (λ) of light beam and the number of aperture NA corresponding to the first to third optical discs 10A, 10B and 10C is described in the following table:

TABLE 3

| | WAVELENGTH (λ) | NUMBER OF APERTURE (NA) |
|---|---|---|
| 1st OPTICAL DISC (BLUE) | 400 nm | 0.7 |
| 2nd OPTICAL DISC (DVD) | 400 nm | 0.37 |
| 3rd OPTICAL DISC (CD) | 780 nm | 0.45 |

Figure 6:
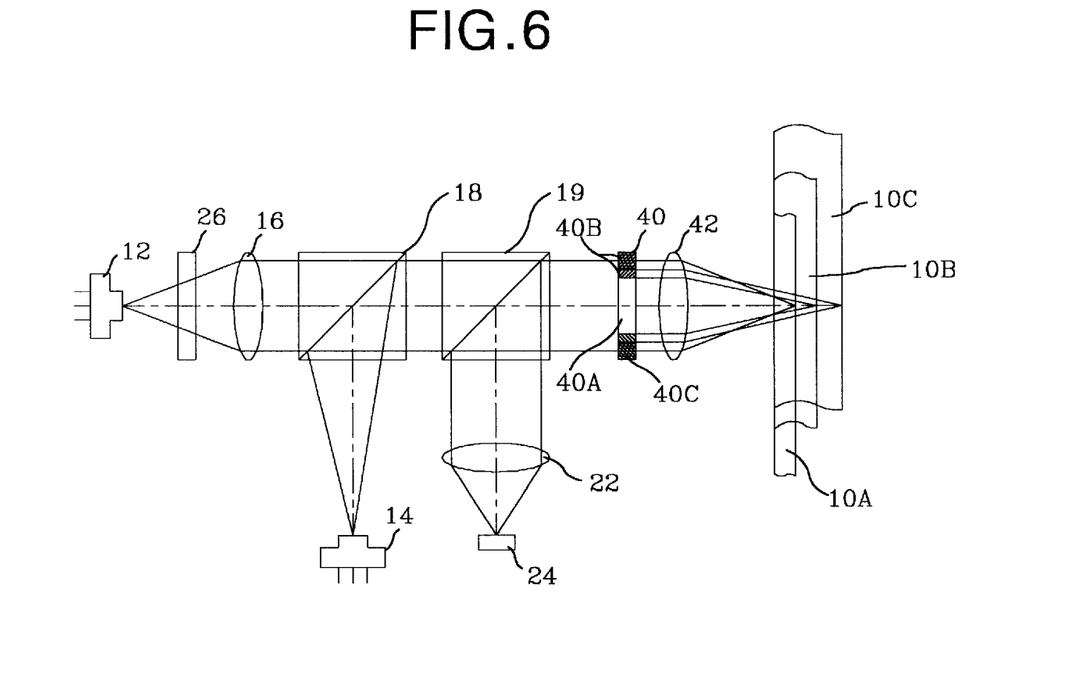
FIG. 6 is a schematic view showing the configuration of an optical system in an optical pickup apparatus according to the fifth embodiment of the present invention.

FIG. 6 shows the configuration of an optical pickup apparatus according to the fifth embodiment of the present invention. The optical pickup apparatus of FIG. 6 includes many of the same elements as the optical pickup apparatus shown in FIG. 5 except for a single objective lens 42 and a wave selecting polarizing plate 40 arranged between the second beam splitter 19 and the objective lens 42 to control the number of aperture of a light beam into three modes.

In the optical pickup apparatus shown in FIG. 6, the wave selecting polarizing plate 40 consists of a non-polarizing area 40A defined at the center, a polarizing area 40B defined around the non-polarizing area 40A, and a wavelength selecting area 40C defined at the outside of the polarizing area 40B. The non-polarizing area 40A of such a polarizing plate passes the light beam toward the objective lens 42 independently of the polarization characteristics of an incident light beam. The polarizing area 40B and the wavelength selecting area 40C pass the light beam when the polarized direction of an incident beam is identical to its polarized direction while it shuts out the light beam when the polarized direction of an incident beam is different from its polarized direction. In FIG. 6, the polarizing plate 40 has an area in which the non-polarizing area 40A corresponds to the fourth number of aperture NA4 and is formed in such a manner that the polarizing area shuts out the P wave. Accordingly, when a P wave is received, a flux diameter is controlled by the polarizing area 40B to control the number of aperture. In the polarizing plate 40, the wave selecting area 40C is coated to shut out a specified direction of polarized beam and a specified wavelength of light beam. In FIG. 6, the inner circumference of the wave selecting area 40C has a size corresponding to the third number of aperture NA3 and shuts out a light beam with the third wavelength (λ3), i.e., 780 nm. Access to the first to third optical discs 10A, 10B and 10C in such an optical pickup apparatus will now be described in detail.

When the first optical disc 10A is accessed in the optical pickup apparatus of FIG. 6, the first optical source 12 is driven and a voltage is applied to the liquid crystal plate 26. A first wavelength (λ1) of S wave generated at the first light source 12 is incident on the objective lens 42 by way of the liquid crystal plate 26 applied with a voltage, the collimator lens 16, the first and second beam splitters 18, 19 and the wavelength selecting polarizing plate 40. This incident light beam is converged by the objective lens 42 with the first number of aperture NA1 to be irradiated onto the recording face of the first optical disc 10A at the first beam spot size d1.

When the second optical disc 10B is accessed, the first light source 12 is driven and a voltage is not applied to the liquid crystal plate 26. A first wavelength (λ1) of S wave generated at the first light source 12 is converted into P wave by the liquid crystal plate 26 in which a voltage is not applied, and is incident on the wavelength selecting polarizing plate 40 by way of the first and second beam splitters 18 and 19. The P wave received into the wavelength selecting polarizing plate 40 is shut out at the polarizing area 40B and pass through only the non-polarizing area 40A, so that the number of aperture NA of a light beam is controlled into the fourth number of aperture NA4 to be incident on the objective lens 42. This incident light beam is converged by the objective lens 42 and irradiated onto the recording face of the second optical disc 10B with a second beam spot size d2.

When the third optical disc 10C is accessed, the second light source 14 is driven. A third wavelength (λ3) of S wave generated at the second light source 14 is perpendicularly reflected by the beam splitter 18 to thereby be incident on the wave selecting polarizing plate 40 by way of the second beam splitter 19. The third wavelength (λ3) of S wave received into the wave selecting polarizing plate 40 is shut out only at the outermost wavelength selecting area 40C, so that the number of aperture NA of a light beam is controlled into the third number of aperture NA3 to be incident to the objective lens 42. This incident light beam is converged by the objective lens 42 and irradiated onto the recording face of the third optical disc 10C with the third beam spot size d3.

The optical pickup apparatus according to the present invention can obtain first to third beam spot sizes d1, d2 and d3 corresponding to the blue laser, the DVD and CD, respectively, using a light beam with a first wavelength (λ1) of about 400 nm and a second wavelength (λ2) of about 650 nm, and the first number of aperture NA1 of about 0.7, the second number of aperture NA2 of about 0.6 and the fourth number of aperture NA4 of about 0.45. In this case, a relationship of the first to third beam spot sizes d1, d2 and d3 with respect to the wavelength λ and the number of aperture NA can be expressed by the following formula:

$$d1 = k\frac{\lambda 1}{NA1} \quad (7)$$

$$d2 = k\frac{\lambda 2}{NA2}$$

$$d3 = k\frac{\lambda 2}{NA4}$$

It can be seen from the formula (7) that the optical pickup apparatus makes use of the first wavelength λ1 and the first number of aperture NA1 in the case of accessing the HD-DVD, of the two wavelength λ2 and the second number of aperture NA2 in the case of accessing the DVD, and of the second wavelength λ2 and the fourth number of aperture NA4 in the case of accessing the CD. To this end, an optical pickup apparatus according to the sixth embodiment of the present invention has a configuration as shown in FIG. 8.

Figure 8:
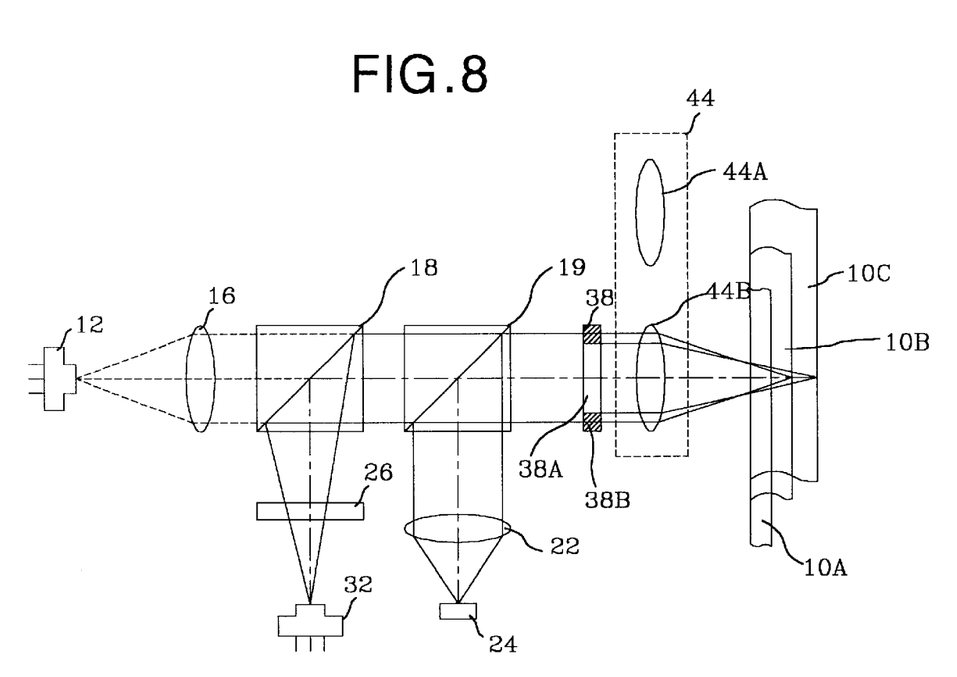
FIG. 8 is a schematic view showing the configuration of an optical system in an optical pickup apparatus according to the sixth embodiment of the present invention.

The optical pickup apparatus in FIG. 8 includes many of the same elements as the optical pickup apparatus in FIG. 5 except for a second light source 32 for generating a second wavelength (λ2) of light beam, a liquid crystal plate 26 arranged at the side of the second light source 32, and a twin objective lens 44 consisting of first and second objective lens 44A and 44B having the first and second aperture numbers NA1 and NA2, respectively.

When the first optical disc 10A is accessed in the optical pickup apparatus of FIG. 8, the first optical source 12 is driven and the first objective lens 44A with the first number of aperture NA1 is positioned at a light path by a driving of the twin objective lens 44. A first wavelength (λ1) of S wave generated at the first light source 12 is incident on the first objective lens 44A by way of the collimator lens 16, the first and second beam splitters 18, 19 and the polarizing plate 38. This incident light beam is converged by the first objective lens 44A with the first number of aperture NA1 to be irradiated onto the recording face of the first optical disc 10A at the first beam spot size d1.

When the second optical disc 10B is accessed, the second to light source 32 is driven and a voltage is applied to the liquid crystal plate 26, and, simultaneously, the second objective lens 44B with the second number of aperture NA2 is positioned at a light path by a driving of the twin objective lens 44. A second wavelength (λ2) of S wave generated at the second light source 32 is incident on the second objective lens 44B by way of the liquid crystal plate 26 applied with a voltage, the first and second beam splitters 18 and 19 and the polarizing plate 38. This incident light beam is converged by the second objective lens 44B and irradiated onto the recording face of the second optical disc 10B with a second beam spot size d2.

When the third optical disc 10C is accessed, the second light source 32 is driven and a voltage is not applied to the liquid crystal plate 26 and, simultaneously, the second objective lens 44B is positioned at a light path by a driving of a twin objective lens 44. A second wavelength (λ2) of S wave generated from the second light source 32 is converted into the P wave by the liquid crystal plate 26 in which a voltage is not applied and is perpendicularly reflected by the first beam splitter 18, and thereafter is incident to the polarizing plate 38 by way of the second beam splitter 19. The P wave received into the polarizing plate 38 is shut out at the outer polarizing area 38B and is passed through the non-polarizing area 38A only, so that the number of aperture NA of a light beam is controlled into the fourth number of aperture NA4 and is incident to the second objective lens 44B. This incident light beam is converged by the second objective lens 44B and irradiated onto the recording face of the third optical disc 10C with the third beam spot size d3. A numerical value example of a wavelength (λ) of light beam and the number of aperture NA corresponding to the first to third optical discs 10A, 10B and 10C is described in the following table:

TABLE 4

| | WAVELENGTH (λ) | NUMBER OF APERTURE (NA) |
|---|---|---|
| 1st OPTICAL DISC (BLUE) | 400 nm | 0.7 |
| 2nd OPTICAL DISC (DVD) | 650 nm | 0.6 |
| 3rd OPTICAL DISC (CD) | 650 nm | 0.37 |

Figure 7:
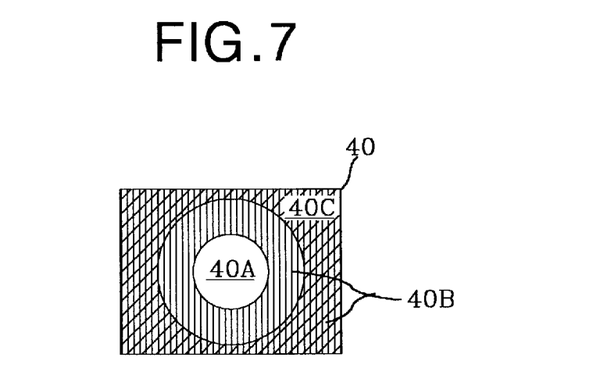
FIG. 7 is a plan view of the polarizing plate for wavelength selection shown in FIG. 6.
Figure 9:
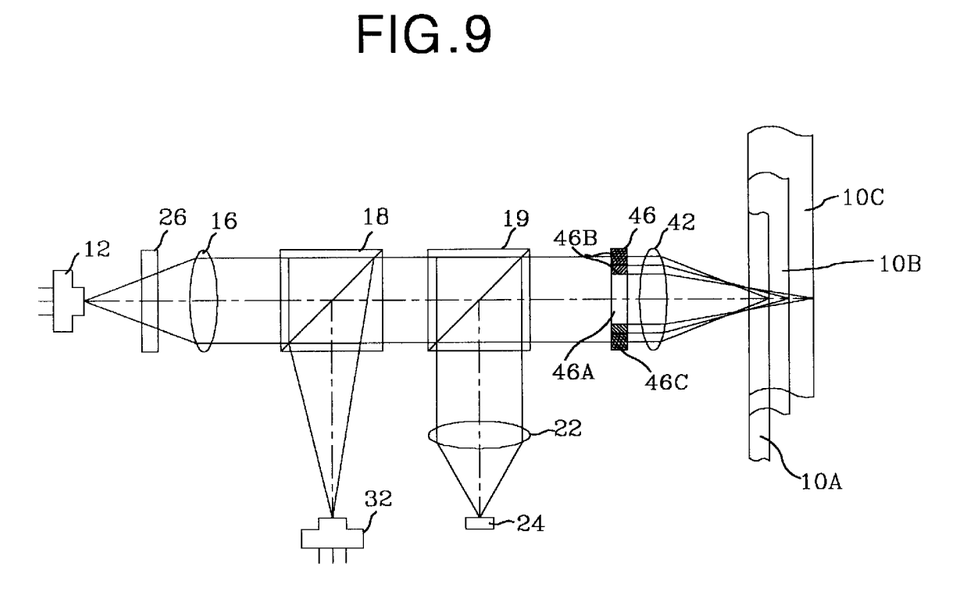
FIG. 9 is a schematic view showing the configuration of an optical system in an optical pickup apparatus according to the seventh embodiment of the present invention.

FIG. 9 shows the configuration of an optical pickup apparatus according to the seventh embodiment of the present invention. The optical pickup apparatus of FIG. 7 includes many of the same elements as the optical pickup apparatus shown in FIG. 6 except for a second light source 32 for generating a second wavelength (λ2) of light beam, and a wavelength selecting polarizing plate 46 in which the inner circumference of the wavelength selecting area 46B has the second number of aperture NA2 and the wavelength selecting area 46C is formed to shut out a second wavelength (λ2) of light beam.

When the first optical disc 10A is accessed in the optical pickup apparatus of FIG. 9, the first light source 12 is driven and a voltage is applied to the liquid crystal plate 26. A first wavelength (λ1) of S wave generated at the first light source 12 is incident on the objective lens 42 by way of the liquid crystal plate 26 applied with a voltage, the collimator lens 16, the first and second beam splitters 18, 19 and the wavelength selecting polarizing plate 46. This incident light beam is converged by the first objective lens 42 with the first number of aperture NA1 to be irradiated onto the recording face of the first optical disc 10A at the first beam spot size d1.

When the second optical disc 10B is accessed, the second light source 32 is driven. A second wavelength (λ2) of S wave generated at the second light source 32 is reflected by the first beam splitter 18 and is incident on the wavelength selecting polarizing plate 46 by way of the second beam splitter 19. The second wavelength (λ2) of S wave is shut out by the outermost wavelength selecting area 46C only, so that the number of aperture NA of a light beam is controlled into the second number of aperture NA2 to be incident on the objective lens 42. This incident light beam is converged by the objective lens 42 and irradiated onto the recording face of the second optical disc 10B with a second beam spot size d2.

When the third optical disc 10C is accessed, the second light source 32 is driven. A second wavelength (λ2) of S wave generated at the second light source 32 is perpendicularly reflected by the beam splitter 18 to thereby be incident to the wave selecting polarizing plate 46 by way of the second beam splitter 19. The S wave received into the wave selecting polarizing plate 46 is shut out at the polarizing area 46B including the wavelength selecting area 46C and passed through the non-polarizing area 46A only, so that the number of aperture NA of a light beam is controlled into the fourth number of aperture NA4 to be incident on the objective lens 42. This incident light beam is converged by the objective lens 42 and irradiated onto the recording face of the third optical disc 10C with the third beam spot size d3.

As described above, the optical pickup apparatus according to the present invention can access three types of optical discs that have different recording densities and light transmission layers using light beam sizes suitable for each disc making use of two optical sources generating different wavelengths of light beams and an optical system controlled into two aperture number modes. Also, the optical pickup apparatus according to the present invention can obtain beam spots having sizes corresponding to a HD DVD (blue laser), a DVD and a CD by utilizing an appropriate combination of a single light source generating the shortest different wavelength of light beams with an optical system for controlling the number of aperture of a light beam into three modes.

More specifically, the optical pickup apparatus according to the present invention can obtain first to third beam spot sizes d1, d2 and d3 corresponding to the blue laser, the DVD and CD, respectively, using a light beam with a first wavelength (λ1) of about 400 nm, the first number of aperture NA1 of about 0.7, the fourth number of aperture NA4 of about 0.37 and the fifth number of aperture NA5 of about 0.23 less than the fourth number of aperture NA4. In this case, a relationship of the first to third beam spot sizes d1, d2 and d3 with respect to the wavelength λ and the number of aperture NA can be expressed by the following formula:

$$d1 = k\frac{\lambda 1}{NA1} \qquad (8)$$

$$d2 = k\frac{\lambda 1}{NA4}$$

$$d3 = k\frac{\lambda 1}{NA5}$$

It can be seen from the formula (8) that the optical pickup apparatus makes use of the first wavelength λ1 and the first number of aperture NA1 in the case of accessing the HD-DVD, of the first wavelength λ1 and the fourth number of aperture NA4 in the case of accessing the DVD, and of the first wavelength λ1 and the fifth number of aperture NA5 in the case of accessing the CD. To this end, an optical pickup apparatus according to the eighth embodiment of the present invention has a configuration as shown in FIG. 10.

Figure 10:
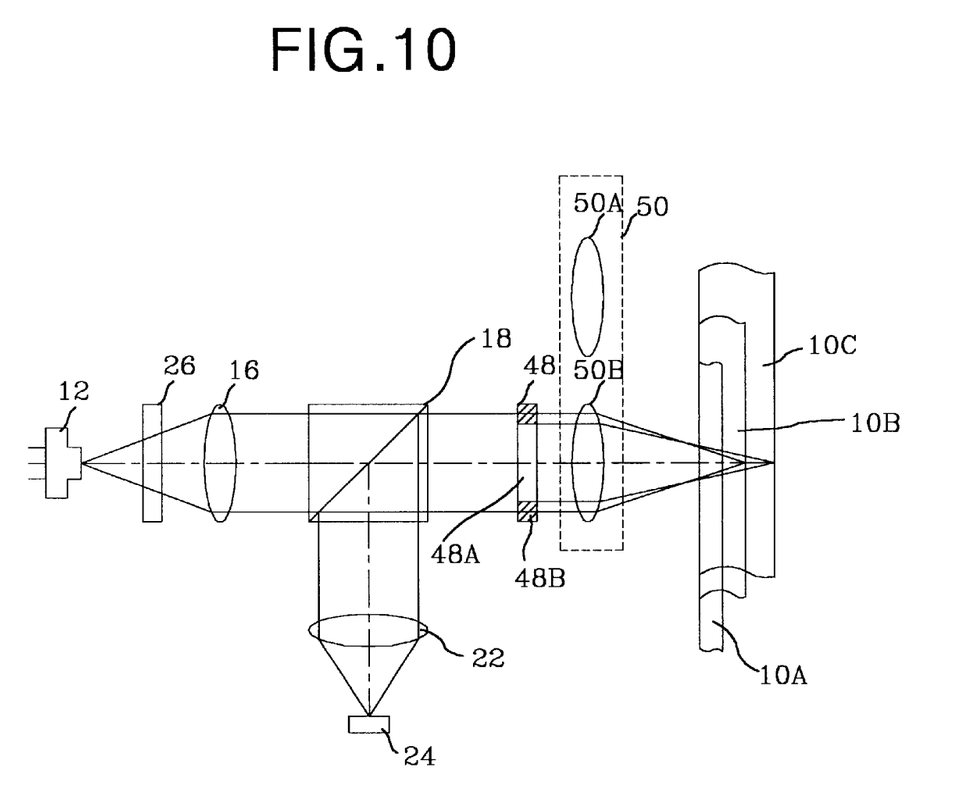
FIG. 10 is a schematic view showing the configuration of an optical system in an optical pickup apparatus according to the eighth embodiment of the present invention.

Referring now to FIG. 10, the optical pickup apparatus includes a light source 12 for generating a first wavelength (λ1) of light beam, a twin objective lens 50 for converging a light beam generated from the light source 12 onto recording faces of first to third optical discs 10A, 10B and 10C, a liquid crystal plate 26 and a polarizing plate 48 arranged between the light source 12 and the twin objective lens 50 to control the number of aperture, and a photo detector 24 for converting light beams reflected from the optical discs 10A, 10B and 10C into electrical signals. Further, the optical pickup apparatus includes a beam splitter 18 arranged among the liquid crystal plate 26, the polarizing plate 48 and the photo detector 24, a collimator lens 16 arranged between the liquid crystal plate 26 and the beam splitter 18, and a sensor lens 22 arranged between the photo detector 24 and the beam splitter 18. In the optical pickup apparatus of FIG. 10, the twin objective lens 50 includes first and second objective lens 50A and 50B having the first and fourth number of aperture NA1 and NA4, respectively. The polarizing plate 48 includes a non-polarizing area 48A having a size corresponding to the fifth number of aperture NA5, and a polarizing area 48B.

When the first optical disc 10A is accessed in such an optical pickup apparatus, a voltage is applied to the liquid crystal plate 26 and the first objective lens 50A with the first number of aperture NA1 is positioned at a light path by a driving of the twin objective lens 50. A first wavelength (λ1) of S wave generated at the first light source 12 is incident to the first objective lens 50 by way of the liquid crystal plate 26 applied with a voltage, the collimator lens 16, the beam splitter 18 and the polarizing plate 48 sequentially. This incident light beam is converged by the first objective lens 50A with the first number of aperture NA1 to be irradiated onto the recording face of the first optical disc 10A at the first beam spot size d1.

When the second optical disc 10B is accessed, a voltage is applied to the liquid crystal plate 26 and the second objective lens 50B with the fourth number of aperture NA4 is positioned at a light path by a driving of the twin objective lens 50. A first wavelength (λ1) of S wave generated at the light source 12 is incident on the second objective lens 50B by way of the liquid crystal plate 26, the beam splitter 18 and the polarizing plate 48. This incident light beam is converged by the second objective lens 50B and irradiated onto the recording face of the second optical disc 10B with a second beam spot size d2.

When the third optical disc 10C is accessed, a voltage is not applied to the liquid crystal plate 26 and the first and second objective lens 50A and 50B are positioned at a light path by a driving of a twin objective lens 50. A first wavelength (λ1) of S wave generated from the light source 12 is converted into P wave by the liquid crystal plate 26 in which a voltage is not applied, and then is incident on the polarizing plate 48 by way of the beam splitter 18. The P wave received into the polarizing plate 48 is shut out at the outer polarizing area 48B and passed through the non-polarizing area 48A, so that the number of aperture of a light beam is controlled into the fifth number of aperture NA5 to be incident on the first or second objective lens 50A or 50B. This incident light beam is converged by the first or second objective lens 44A or 44B and irradiated onto the recording face of the third optical disc 10C with the third beam spot size d3. A numerical value example of a wavelength (λ) of light beam and the number of aperture NA corresponding to the first to third optical discs 10A, 10B and 10C is described in the following table:

TABLE 5

|  | WAVELENGTH (λ) | NUMBER OF APERTURE (NA) |
|---|---|---|
| 1st OPTICAL DISC (BLUE) | 400 nm | 0.7 |
| 2nd OPTICAL DISC (DVD) | 400 nm | 0.37 |
| 3rd OPTICAL DISC (CD) | 400 nm | 0.23 |

Accordingly, the optical pickup apparatus according to the present invention can access three types of optical discs that have different recording densities and the light transmission layers using light beam sizes suitable for each disc by utilizing an optical system controlled into the blue laser and three aperture number modes.

As described above, the optical pickup apparatus according to the present invention can access three types of optical disc having a different layout condition by making use of two light sources generating a different wavelength of light beam and an optical system controlled into two aperture number modes. Also, the optical pickup apparatus according to the present invention can access three types of optical disc having a different layout condition at the light beam sizes suitable for them by making use of two light sources generating a different wavelength of light beam and an optical system controlled into two aperture number mode. Furthermore, the optical pickup apparatus can access three types of optical discs different in the layout condition at the light beam sizes suitable for them making use of the blue laser and an optical system controlled into three aperture number modes. Accordingly, the configuration of the optical pickup capable of changeably accessing a plurality type of optical discs can be not only simplified, but also its manufacturing cost can be reduced. Moreover, the optical pickup apparatus according to the present invention can implement an optical recording/reproducing apparatus capable of the plurality type of optical discs accurately.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical pickup apparatus accessing first to third optical discs with a gradually increasing density, comprising:
   first and second light sources for respectively generating different wavelengths of light beams;
   an optical system allowing a light beam generated by any one of the first and second light sources to be selectively irradiated onto the discs, said optical system including an aperture number control means for determining the number of aperture of the light beam to have a different value depending on an optical disc to be accessed whereby a light beam generated at the first light source to be irradiated with a first value of aperture number when the optical disc to be accessed is the first optical disc, said optical system allowing a light beam generated at the second light source to be irradiated with a second value of aperture number smaller than the first value of aperture number when the optical disc to be accessed is the second optical disc, said aperture number control means including a wave selecting-polarizing member capable of performing both a wavelength selecting function for selecting between different wavelengths of light beams and a polarizing function; and
   photo detecting means for detecting a light beam reflected from the accessed optical disc and converting it into an electrical signal,
   wherein the optical system allows a light beam generated at the first light source to be irradiated when the optical disc to be accessed is the first optical disc, whereas it allows a light beam generated at any one of the first and second light sources to be irradiated when the optical disc to be accessed is any one of the second and third optical discs.

2. An optical pickup apparatus as claimed in claim 1, wherein the first light source generates a light beam with a wavelength of about 400 nm, and the second light source generates a light beam with a wavelength of about 780 nm.

3. An optical pickup apparatus as claimed in claim 1, wherein the first light source generates a light beam with a wavelength of about 400 nm, and the second light source generates a light beam with a wavelength of about 650 nm.

4. An optical pickup apparatus as claimed in claim 1, wherein the aperture number control means allows the number of aperture to have a first value when the optical disc to be accessed is the first optical disc, whereas it allows the number of aperture to have a first value or a second value when the optical disc to be accessed is any one of the second and third optical discs.

5. An optical pickup apparatus as claimed in claim 1, wherein the aperture number control means comprises:
   an objective lens for converging the light beam onto the optical disc to be accessed;
   polarization converting means for selectively converting a polarization characteristic of the light beam depending on whether or not a voltage is applied; and
   polarization selecting means, being integral to the objective lens, for selectively shutting out a portion of the light beam received from the polarization converting means in accordance with the polarization characteristic.

6. An optical pickup apparatus as claimed in claim 1, wherein the aperture number control means allows the number of aperture to have a first value when the optical disc to be accessed is the first optical disc; it allows the number of aperture to have a second value when the optical disc to be accessed is the second optical disc; and it allows the number of aperture to have a third value when the optical disc to be accessed is the third optical disc.

7. An optical pickup apparatus as claimed in claim 6, wherein the first value of the number of aperture is about 0.7, the second value of the number of aperture is about 0.37, and the third value of the number of aperture is about 0.45.

8. An optical pickup apparatus as claimed in claim 6, wherein the first value of the number of aperture is about 0.7, the second value of the number of aperture is about 0.6, and the third value of the number of aperture is about 0.37.

9. An optical pickup apparatus as claimed in claim 6, wherein the aperture number control means further comprises:

an objective lens for converging the light beam onto the optical disc to be accessed; and the wave selecting-polarizing member including,
polarization converting means for selectively converting a polarization characteristic of the light beam depending on whether or not a voltage is applied, and
polarization selecting means, being integral to the objective lens, for selectively shutting out a portion of the light beam received from the polarization converting means and selectively shutting out a portion of the light beam of a specified wavelength in accordance with the polarization characteristic.

10. An optical pickup apparatus as claimed in claim 9, wherein the polarization selecting means comprises:

a non-polarizing area defined at the center thereof to transmit the incident beam independently of the polarization characteristic;

a polarizing area defined around the non-polarizing area to selectively shutting out the incident beam depending on the polarization characteristic; and a wavelength selecting area, being defined the outer portion thereof to include the polarizing area, for shutting out the specified wavelength of light beam.

11. An optical pickup apparatus as claimed in claim 1, wherein the optical system further comprises:

a first beam splitter for progressing the optical disc to be accessed toward a light beam generated from any one of the first and second light sources;

a second beam splitter for progressing the light beam received from the first beam splitter toward the optical disc to be accessed and for progressing the reflective light beam reflected from the optical disc to be accessed toward the photo detecting means;

a collimator lens for progressing the light beam generated from any one of the first and second light sources toward the first beam splitter in parallel; and a sensor lens for converging the reflective light beam received from the second beam splitter into the photo detecting means.

12. An optical recording/reproducing apparatus including the optical pickup apparatus as described in claim 1.

13. An optical pickup apparatus accessing first to third optical discs with a gradually increasing density, comprising:

a light source for generating a certain wavelength of light beam;

an optical system allowing the light beam to be irradiated on an optical disc to be accessed, said system having aperture number control means for allowing the number of aperture of the light beam to have a different value depending on the optical disc to be accessed, said aperture number control means including a wavelength selecting-polarizing member capable of performing both a wavelength selecting function for selecting between different wavelengths of light beams and a polarizing function; and photo detecting means for detecting a light beam reflected from the accessed optical disc and converting the detecting light beam into an electrical signal, wherein the aperture number control means allows the number of aperture to have a first value when the optical disc to be accessed is the first optical disc; it allows the number of aperture to have a second value when the optical disc to be accessed is the second optical disc; and it allows the number of aperture to have a third value when the optical disc to be accessed is the third optical disc.

14. An optical pickup apparatus as claimed in claim 13, wherein the light source generates a light beam with a wavelength of about 400 nm.

15. An optical pickup apparatus for accessing first to third optical discs of a gradually increasing density, comprising:

first and second light sources for respectively generating different wavelengths of light beams;

an optical system allowing a light beam generated by any one of the first and second light sources to be selectively irradiated onto the discs and having aperture number control means for determining the number of aperture of the light beam to be a different value depending on an optical disc to be accessed whereby the optical system causes a light beam generated at the first light source to be irradiated with a first value of aperture number when the optical disc to be accessed is the first optical disc, allows the light beam generated at the first light source to be irradiated with a second value of aperture number smaller than the first value of aperture number when the optical disc to be accessed is the second optical disc, and allows a light beam generated at the second light source to be irradiated with a third value of aperture number smaller than the second value of aperture number when the optical disc to be accessed is the third optical disc, said aperture number control means including a wavelength selecting-polarizing member capable of performing both a wavelength selecting function for selecting between different wavelengths of light beams and a polarizing function; and photo detecting means for detecting a light beam reflected from the accessed optical disc and converting it into an electrical signal.

16. An optical pickup apparatus as claimed in claim 15, wherein one of the first and second light sources generates a light beam with a wavelength of about 400 nm.

17. An optical pickup apparatus accessing first to third optical discs with a gradually increasing density, comprising:

first and second light sources for respectively generating different wavelengths of light beams;

an optical system allowing a light beam generated by any one of the first and second light sources to be selectively irradiated onto the discs, said optical system including an aperture number control means for determining the number of aperture of the light beam to have a different value depending on an optical disc to be accessed whereby a light beam generated at the first light source to be irradiated with a first value of aperture number when the optical disc to be accessed is the first optical disc, said optical system allowing a light beam generated at the second light source to be irradiated with a second value of aperture number smaller than the first value of aperture number when the optical disc to be accessed is the second optical disc, said aperture number control means including a wave selecting-polarizing member capable of performing both a wavelength selecting function for selecting between different wavelengths of light beams and a polarizing function; and photo detecting means for detecting a light beam reflected from the accessed optical disc and converting it into an electrical signal, wherein the aperture number control means comprises,
an objective lens for converging the light beam onto the optical disc to be accessed;
polarization converting means for selectively converting a polarization characteristic of the light beam depending on whether or not a voltage is applied; and
polarization selecting means, being integral to the objective lens, for selectively shutting out a portion of the light beam received from the polarization converting means in accordance with the polarization characteristic.

18. An optical pickup apparatus accessing first to third optical discs with a gradually increasing density, comprising:

first and second light sources for respectively generating different wavelengths of light beams;

an optical system allowing a light beam generated by any one of the first and second light sources to be selectively irradiated onto the discs, said optical system including an aperture number control means for determining the number of aperture of the light beam to have a different value depending on an optical disc to be accessed whereby a light beam generated at the first light source to be irradiated with a first value of aperture number when the optical disc to be accessed is the first optical disc, said optical system allowing a light beam generated at the second light source to be irradiated with a second value of aperture number smaller than the first value of aperture number when the optical disc to be accessed is the second optical disc, said aperture number control means including a wave selecting-polarizing member capable of performing both a wavelength selecting function for selecting between different wavelengths of light beams and a polarizing function; and photo detecting means for detecting a light beam reflected from the accessed optical disc and converting it into an electrical signal, wherein the optical system further comprises,
a first beam splitter for progressing the optical disc to be accessed toward a light beam generated from any one of the first and second light sources;
a second beam splitter for progressing the light beam received from the first beam splitter toward the optical disc to be accessed and for progressing the reflective light beam reflected from the optical disc to be accessed toward the photo detecting means;
a collimator lens for progressing the light beam generated from any one of the first and second light sources toward the first beam splitter in parallel; and
a sensor lens for converging the reflective light beam received from the second beam splitter into the photo detecting means.

19. An optical recording/reproducing apparatus comprising an optical pickup apparatus accessing first to third optical discs with a gradually increasing density, the optical pickup apparatus comprising:

first and second light sources for respectively generating different wavelengths of light beams;

an optical system allowing a light beam generated by any one of the first and second light sources to be selectively irradiated onto the discs, said optical system including an aperture number control means for determining the number of aperture of the light beam to have a different value depending on an optical disc to be accessed whereby a light beam generated at the first light source to be irradiated with a first value of aperture number when the optical disc to be accessed is the first optical disc, said optical system allowing a light beam generated at the second light source to be irradiated with a second value of aperture number smaller than the first value of aperture number when the optical disc to be accessed is the second optical disc, said aperture number control means including a wave selecting-polarizing member capable of performing both a wavelength selecting function for selecting between different wavelengths of light beams and a polarizing function; and photo detecting means for detecting a light beam reflected from the accessed optical disc and converting it into an electrical signal.

* * * * *